United States Patent [19]

Hsieh

[11] 4,363,561
[45] Dec. 14, 1982

[54] LOCKING DEVICE FOR PERCUSSION INSTRUMENTS' STAND

[75] Inventor: C. L. Hsieh, Taipei Hsien, Taiwan

[73] Assignee: Kung Hsue She Educational Supplies Co., Ltd., Taipei Hsien, Taiwan

[21] Appl. No.: 245,713

[22] Filed: Mar. 20, 1981

[51] Int. Cl.³ ............... F16C 11/00; F16D 1/12; F16D 3/00

[52] U.S. Cl. ............... 403/92; 84/421; 403/97

[58] Field of Search ............... 403/92, 93, 97, 110, 403/161, 164; 84/327, 387 A, 385 B, 421; 248/124, 291, 289 R

[56] References Cited

U.S. PATENT DOCUMENTS

| | | | |
|---|---|---|---|
| 640,241 | 1/1900 | Tracy | 403/92 |
| 2,255,262 | 9/1941 | MacFadden | 403/97 |
| 2,548,650 | 4/1951 | Brandt | 403/97 X |
| 3,945,291 | 3/1976 | Zickos | 84/421 |
| 4,141,272 | 2/1979 | Yanagisawa | 403/92 X |
| 4,158,981 | 6/1979 | Kurosaki | 84/421 |

Primary Examiner—Wayne L. Shedd
Attorney, Agent, or Firm—Oltman and Flynn

[57] ABSTRACT

This invention relates to a locking device applied to the supporting stand of percussion instruments, for example snare stand, tom-tom holder, cymbal stand, timbales stand and all kinds of joints of drum outfits, etc., which locking device allows the splaying angle of the two arms to be adjusted to any operable degree without the inconvenient constraint of the calibrating teeth, thereby largely simplifying the operating procedure and enhancing the practicality thereof.

2 Claims, 3 Drawing Figures

LOCKING DEVICE FOR PERCUSSION INSTRUMENTS' STAND

SUMMARY OF THE INVENTION

This invention relates to a locking device for the stand of percussion instruments, particularly to one of which the splaying angle of the two arm at the junction can be adjusted freely to any desired degree.

The conventional locking device for the stand of a percussion instrument assembly are exclusively of multiple sectional-type, which is formed by indentating each of two opposing discs 91, 92 into a plurality of, typically seventy-two equal, radially spaced divisions of toothing structure (see FIG. 3), in other words, a division per five degrees. This is somewhat annoying to a drummer, since the suitable height of the position of the drums varies with persons. In case the optimal angle happens to fall between two adjacent teeth which are aparted by 5 degrees, the idealest position will be impossible to be obtained. Also, meshingly engaged to prevent the pivotal rotation of the two splaying arms due to the sliding along the interface of the two discs, the prior art cannot be conveniently adjusted.

Accordingly, it is the chief object of this invention to provide an improved locking device for percussion instrument stands whereby the aforesaid disadvantages of the prior art are obviated or mitigated.

These objects of the invention will be accompanied by embodiments as referred to in relation with the annexed drawing of this invention as following.

DETAILED DESCRIPTION

Figure 1:
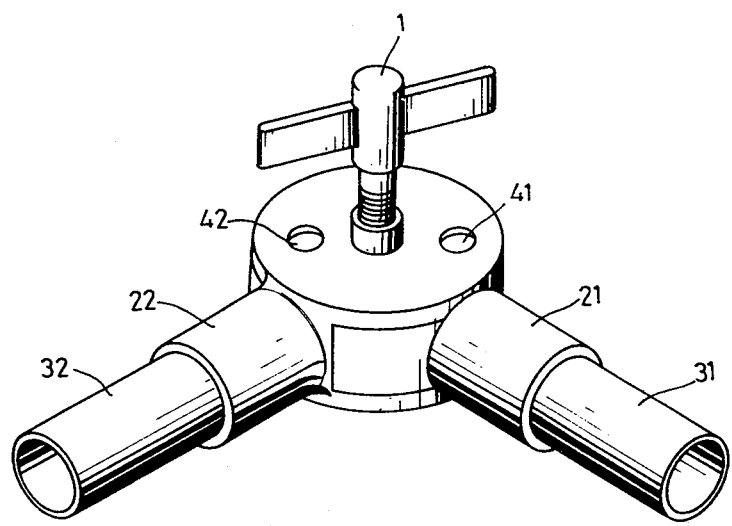
FIG. 1 is a perspective view of this invention.

With reference to FIG. 1, the tightness of the joint can be adjusted by means of a fastening screw 1. Each of the necks 21 and 22 extending from the joint portion respectively mounts a shaft 31, 32, together to define the two arms splaying out from the joint portion.

Figure 2:
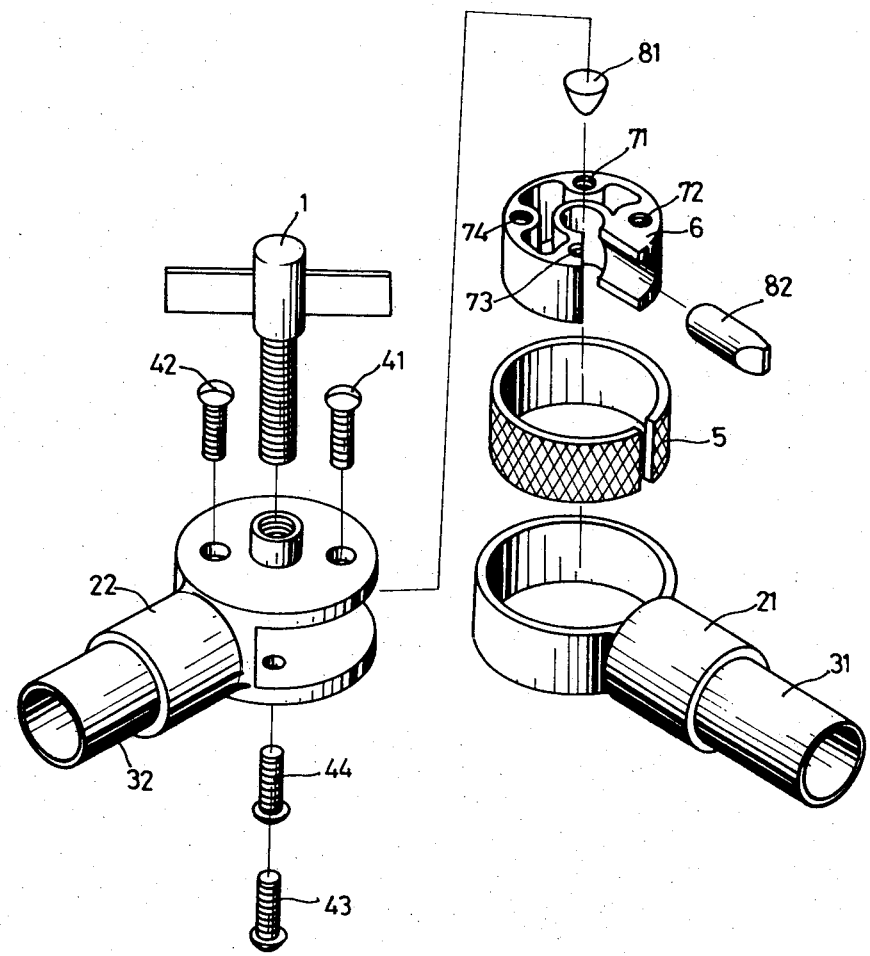
FIG. 2 is an exploded view of this invention.
Figure 3:
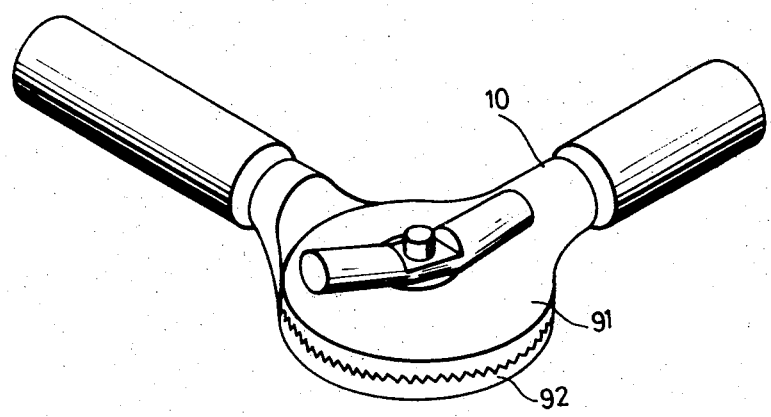
FIG. 3 is a perspective view of a conventional, locking device.

Referring to FIG. 2, the locking mechanism comprises an open resilient ring 5 nested in the annular portion of the joint from which neck 21 extends out a disc-like staple 6 with two bores, including a central bore extending axially through the thickness of the staple 6 to receive a substantially conical piece 81 and another bore extending radially across the thickness and passing through the central axis thereof to receive a pin 82 tapering at one end. The staple 6 is immovably secured to the joint portion which forms two opposing disc-like structures between which said annular portion of the joint is sandwiched and from which neck 22 extends, by passing four screws 41, 42, 43, 44 into the four internally threaded holes 71, 72, 73 and 74. Normally the two arms are pivotally rotatable about the joint when the open resilient ring 5 is not expanded, yet when the fastening screw 1 is turned deeper into the joint, the conical piece 81 is pressed downward, and the latter in turn, pushes pin 82 outward axially. As a result, the tapering tip of pin 82 shoves its way through the narrow opening of resilient ring, thus the ring is radially expanded outwardly and pressed against the inside of the annular portion of the joint so that the two arms are no longer rotatable about the joint.

Preferably, the inner surface of the annular joint portion and the outer surface of resilient ring 5 are fabricated by material resistant to wear and capable of providing considerable friction. Alternatively, the conical piece 81 can be formed as an integral tip of screw 1.

In use, one only need to release the fastening screw 1 and adjust the splaying angle of the two arms to any desirable degree, then fasten the screw. The splaying angle is not restricted by the toothing structure, thus largely help the drummer to sufficiently show off his skill.

It will be understood that this invention is susceptible to further modification and, accordingly, it is desired to comprehend such modifications within this invention as may fall within the scope of the appended claims.

I claim:

1. A locking device applied to the pivot joint of the stands of percussion musical instruments, comprising:
   a fastening screw;
   a first joint portion forming the pivot joint including two opposing disc-like structures from which one arm forming one leg of the stand extends, one of which discs is centrally bored to allow said fastening screw to pass through;
   a second joint portion forming the pivot joint including a hollow annular structure, from which another arm forming another leg of the stand extends, and which can be fitted in between the two said disc-like structures;
   a resilient, expandable open ring nested in said annular structure with a narrow opening;
   a disc-like staple nested in said open ring, with two bores, one of which is centrally and axially located at the axis of said fastening screw, and the other of which extends axially to communicate with the axially located bore;
   a substantially tapering piece, which may either be formed as an integral tip of said fastening screw or as an independent element, and the size of which allows it to pass through said axially located bore of said disc-like staple;
   a pin slidably positioned in said radially extending bore, one end of which is tapering and inserted into the opening of said open ring;
   said disc-like staple being immovably secured to said first joint;
   all the aforementioned component parts being structured and disposed so that when said fastening screw is fastened, said tapering piece will be pushed axially and inwardly and in turn urge said pin to move axially and outwardly so that its tapering end can expand said open ring, and the expanded open ring in turn press against the inner wall of said annular structure to prevent the two arms from pivotal rotation about the joint.

2. The locking device according to claim 1, wherein there exists high friction between the outer surface of said open ring and inner surface of said annular structure.

* * * * *